INVENTOR.
FRANK J. HORLANDER
BY [signature]

INVENTOR.
FRANK J. HORLANDER
BY [signature]
ATTY.

INVENTOR.
FRANK J. HORLANDER
BY [signature]
ATTY.

INVENTOR.
FRANK J. HORLANDER
BY [signature]
ATTY.

GATE GENERATOR SYNCHRONIZER

Filed Dec. 14, 1964 6 Sheets-Sheet 5

INVENTOR.
FRANK J. HORLANDER
BY [signature]
ATTY.

Feb. 14, 1967 F. J. HORLANDER 3,304,504

GATE GENERATOR SYNCHRONIZER

Filed Dec. 14, 1964 6 Sheets-Sheet 6

INVENTOR.
FRANK J. HORLANDER
BY [signature]
ATTY.

United States Patent Office 3,304,504

Patented Feb. 14, 1967

3,304,504
GATE GENERATOR SYNCHRONIZER

Frank J. Horlander, Lexington, Ky., assignor, by mesne assignments, to the United States of America as represented by the Secretary of the Navy Filed Dec. 14, 1964, Ser. No. 418,361
11 Claims. (Cl. 328—72)

The present invention relates to electronic apparatus for frequency measurements and more particularly to apparatus providing materially improved accuracy and reliability in signal frequency measurements.

In the field of frequency counters, the method commonly used to determine an unknown frequency is to count a pulse train derived from the unknown frequency for a fixed interval of time and to interpret the result in terms of frequency, e.g., cycles per second. The state of the counter decades at the end of the counting period with a properly chosen time interval, will indicate frequency directly in binary coded decimal form with the decimal point properly located. Although such systems have served the purpose, they have not proved entirely satisfactory under all conditions of service for the reason that due to the asynchronous nature of the gating scheme there is an uncertainty of ±1 count in the frequency registered by the counter. This ±1 count uncertainty represents an error in the least significant digit of the counter. This error, which, for example may represent ±10 kc. or more of the unknown frequency and the error introduced while the unknown frequency varies during the counting interval is usually too great for practical operation of such overall systems.

The general purpose of this invention is to provide a frequency measuring system which embraces all the advantages of similarly employed systems and possesses none of the aforedescribed disadvantages. To achieve this goal, the present invention contemplates the use of novel synchronous gating circuitry in the frequency measuring system whereby a maximum inherent uncertainty of ±½ count in the least significant digit is attained.

An object of this invention is the provision of novel means which allow almost instantaneous evaluation and presentation of signal frequencies as the signal is intercepted.

Another object is to provide novel means to reduce the inherent uncertainty error in frequency measuring systems.

A further object is to provide novel pulse generating means for converting sine waves into pulses.

Another object is to provide a novel method for improving the accuracy of frequency determining systems.

Other objects and many of the attendant advantages of this invention will be readily appreciated as the same becomes better understood by reference to the following detailed description when considered in connection with the accompanying drawings wherein:

FIG. 1 is a block diagram illustrating a prior art embodiment;

FIGS. 2*a*, 2*b*, and 2*c* show pulse trains serving to illustrate the operation of the system;

Figure 3:
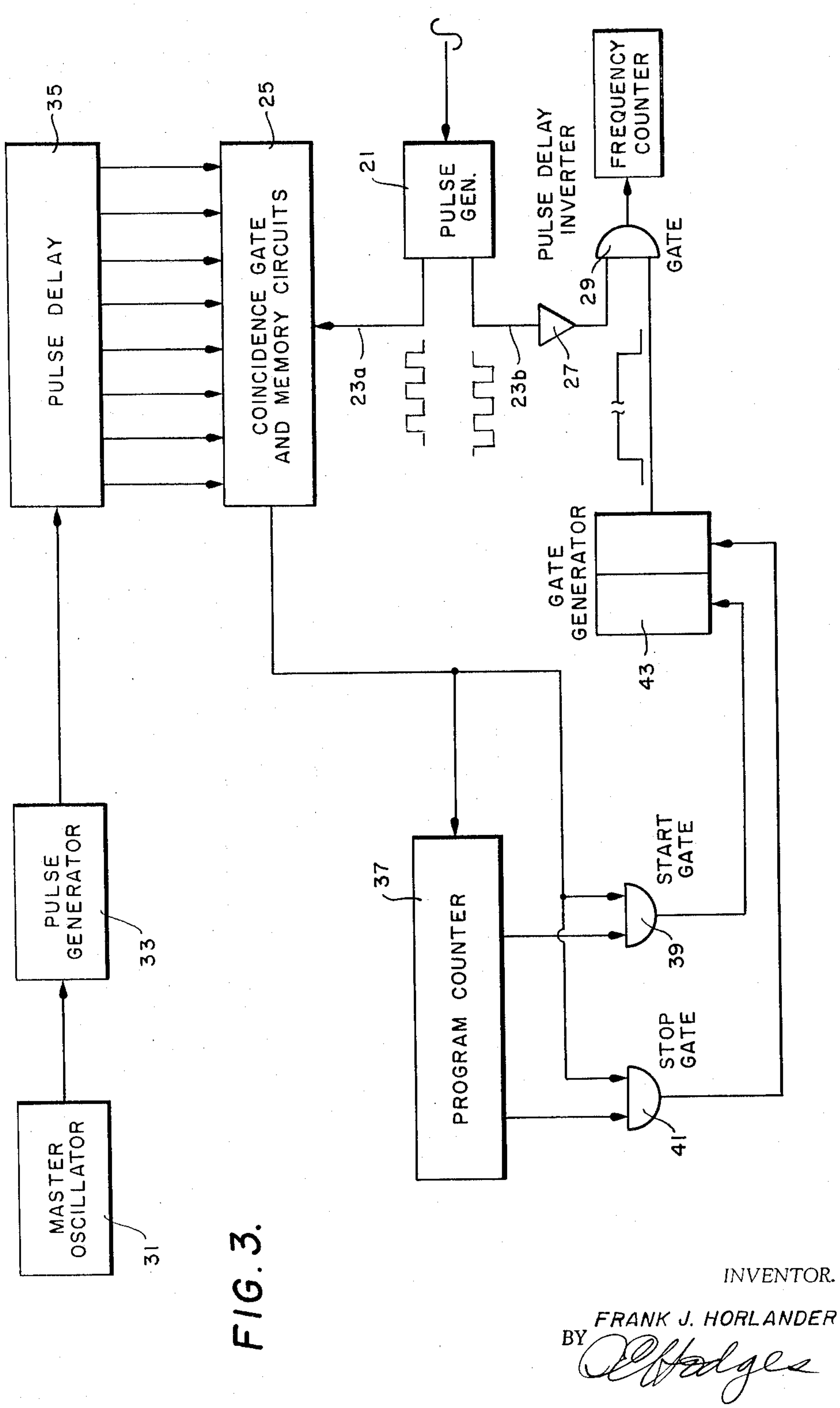
FIG. 3 is a block diagram illustrating an embodiment of the gate generator synchronizer system.
Figure 5A:
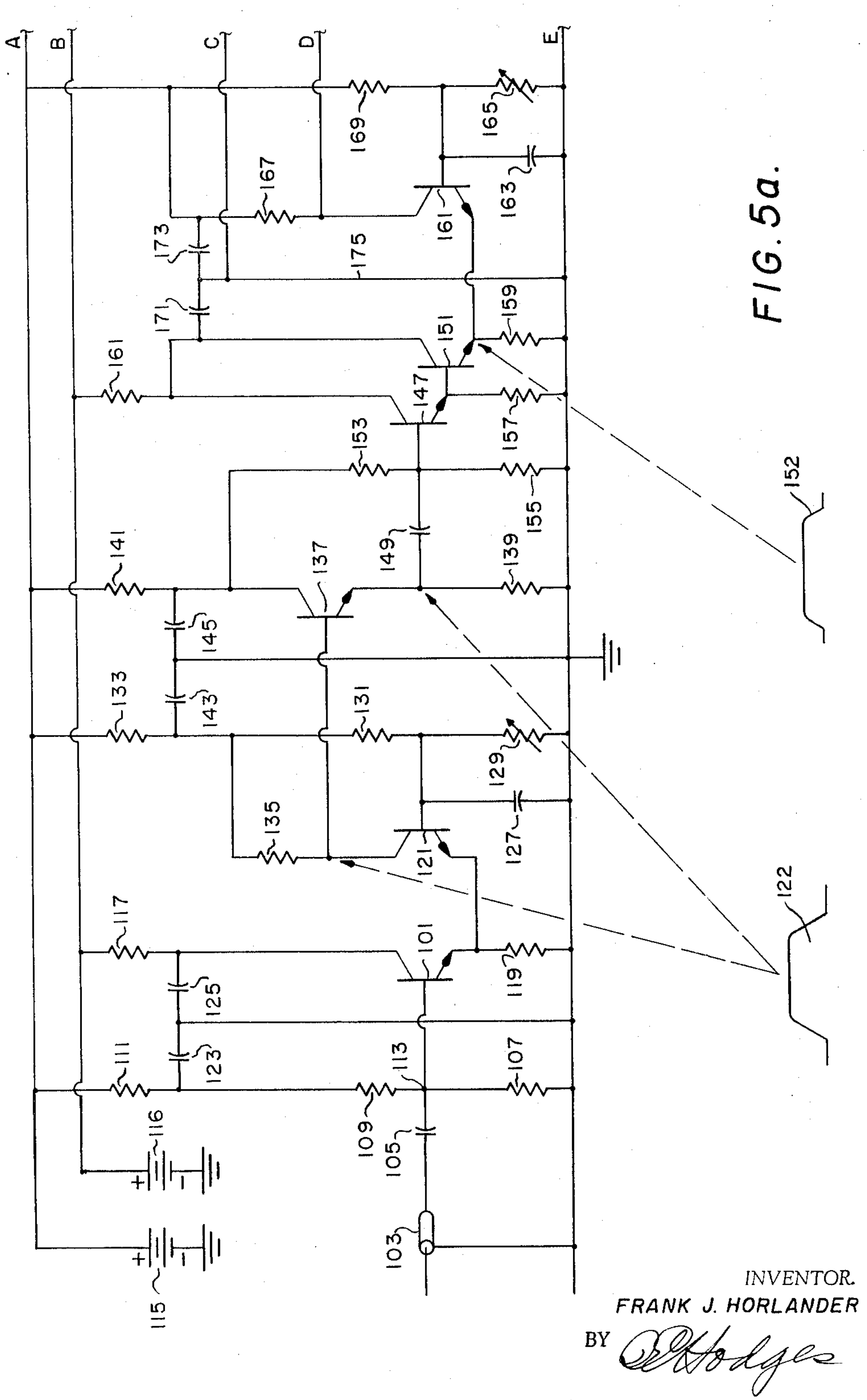
Figure 5B:
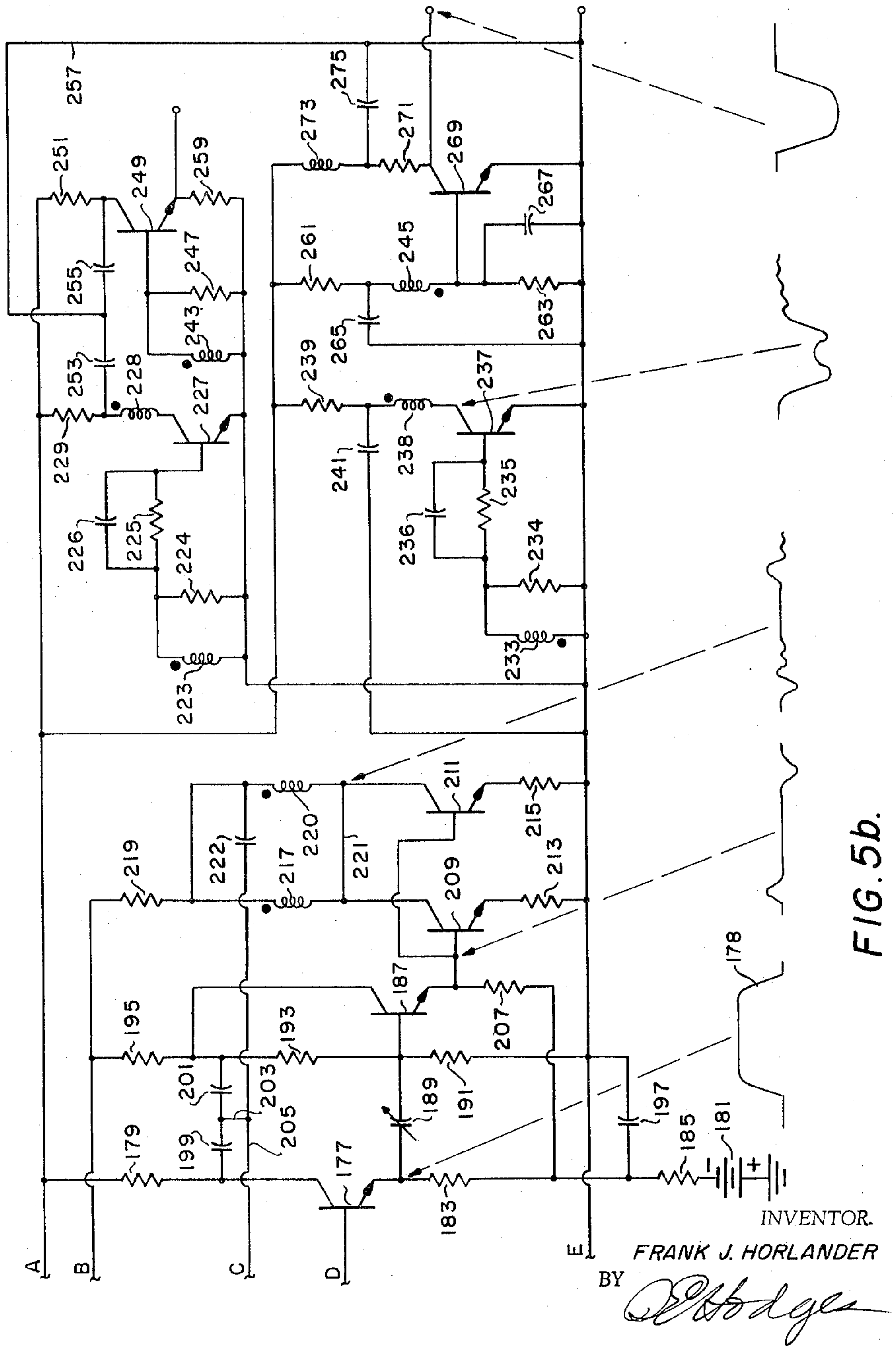
Figure 6:
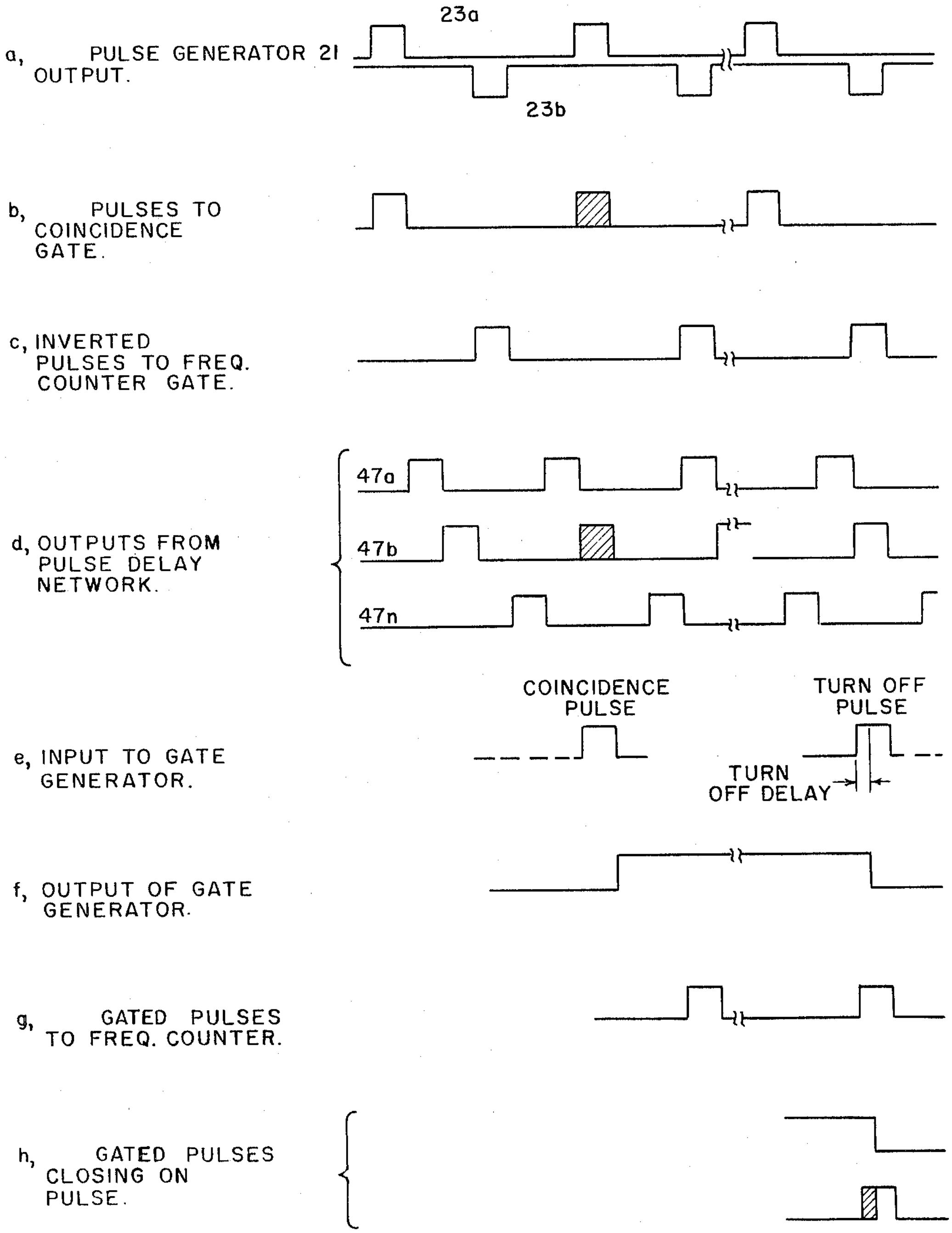

FIGS. 5*a* and 5*b* taken together, show a circuit diagram of the pulse generator incorporated in the system of FIG. 3;

FIG. 6 shows waveforms *a–h* illustrating the character of pulses applied to various points throughout the system.

Figure 1:
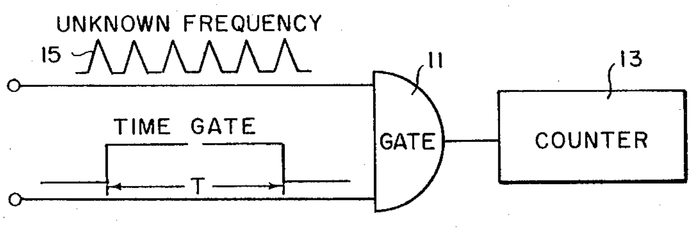
PRIOR ART FIG. 1.

Referring now to the drawings, wherein like reference characters designate like or corresponding parts throughout the several views, there is shown in FIG. 1 (which illustrates a prior art device) a gate 11 and a counter 13, wherein a pulse train 15 derived from an unknown frequency is gated into the counter by a time gate of width T. Due to the asynchronous nature of this gating scheme, there is an inherent uncertainty of ±1 count in the least significant digit of the frequency registered by the counter. This uncertainty error may represent ±10 kc. or more of the unknown frequency with a 100 $\mu$s. time gate.

The present invention provides means for increasing the accuracy of the above case to ±½ count. Means are provided to control the starting edge of the time gate pulse in relation to the pulse train such that it is started exactly midway between any two pulses of the counted pulse train. Therefore, a pulse at the end of the count can vary only ±½ count increment, e.g., 5 kc. for a 100 $\mu$s. gate previously discussed. This is further explained with reference to FIGS. 2*a*, 2*b* and 2*c* which show curves serving to illustrate the operation of frequency measuring systems and thereby aids in understanding the new concept for improved accuracy frequency determination.

Figure 2A:
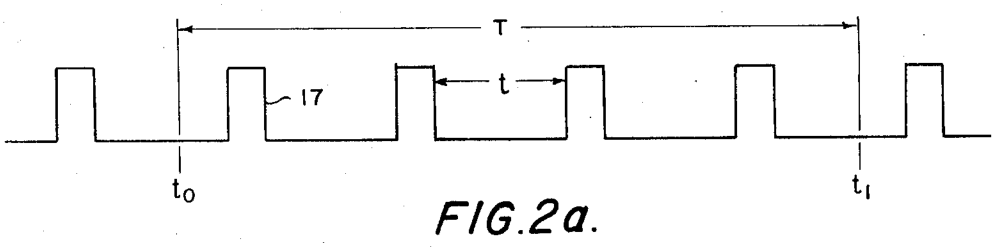
Figure 2B:
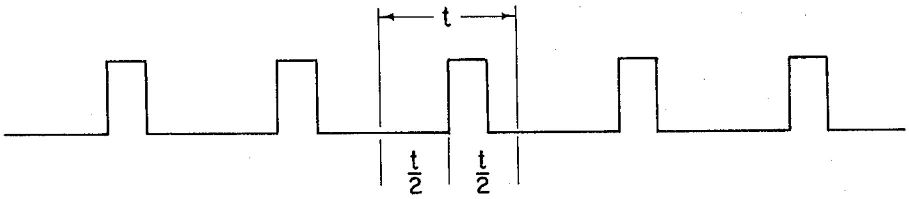

The current practice in frequency measuring systems such as shown in FIG. 1 is indicated by conditions depicted in FIG. 2*a*. The pulse train 17 is shown with some period or regular time interval ($t$) between pulses or a group of pulses. These pulses, or group of pulses may be counted for some interval of time and the resulting number of bits is interpreted for the average pulse repetition rate. The pulse train is gated into the binary counter 13 at some arbitrary time ($t_0$) and this counter registers one bit for each pulse passing through the gate 11. The gate is closed to stop the pulse train to the counter at some later time ($t_1$). The interval during which the gate is open, $t_1-t_0$, is accurately timed so that the repetition rate of the pulses can be computed as the number of bits counted divided by $(t_1-t_0)$, i.e., the $$PRF=N_{(\text{bits})}/(t_1-t_0)$$

This method exhibits an inherent inaccuracy. The number of pulses encompassed by the period (T) may be larger or smaller by one than the number of fundamental periods ($t$) the pulses represent.

Figure 2C:

The study of this problem, i.e., methods and apparatus to improve the system accuracy led to the discovery that by determining the location of the pulses with respect to the leading and trailing edge of the time gate more reliable data were obtained and thereby the inherent inaccuracy could be reduced. This is explained with reference to FIG. 2*b*, wherein each pulse counted represents an interval of time with the pulse located in the middle of the interval. Each counted pulse then represents an interval of time ($t$) except the first and last pulses. The first and last pulses must be interpreted differently as depicted by FIG. 2*c*.

These two pulses represent a time interval of $$at+bt+t/2+t/2=t(a+b)+t=t(1+a+b)$$

The counter registers two bits for these two pulses, representing an interval of $2t$. One of these pulses represents the sum of the two $t/2$ periods, and the other pulse represents a probable error. That is, the sum of $(a+b)t$ has been counted and registered as a 1.

Therefore, the error$=1-(a+b)$.

If $a+b=0$, the error$=+1$.

If $a+b=2$, the error$=-1$.

However, if "$a$" is set equal to ½, the error for $b=0$ is:

$$1-(½+0)=½$$

and for $b=1$ is:

$$1-(½+1)=-½$$

Thus, if the leading edge of the gate pulse is caused to start between pulses, the inherent error of this scheme can be reduced ±½ count. When the gate closes on a pulse there is an uncertainty as to whether enough energy from the pulse passes through the gate and reaches the counter. This uncertainty is equivalent to not knowing whether $b=0$ or $b=1$. Therefore, the ±½ count accuracy is not changed when the gate closes on a pulse.

Gate generators can be started and stopped to produce an accurately controlled gate width. However, there still remains the problem of equalizing the time delays involved in the gate generator and the pulse delivered to the counter. The problem is solved by the concept of a synchronous time gate of which the circuitry means and the compatible waveforms are shown in FIGS. 3, 4, 5*a* and 5*b*.

Referring now to FIG. 3, a block diagram of the synchronous time gate is shown. The unknown frequency having a sine wave waveform is fed into a pulse generator and shaper 21 and emerges as two trains of narrow rectangular pulses 23*a* and 23*b* displaced 180° in phase. The train 23*a* corresponding to the positive half of the sine wave feeds coincidence gate and memory circuits 25. The train of pulses 23*b* corresponding to the negative half of the sine wave, i.e., 180° displaced, is fed into a pulse delay inverter 27 and serves to open the time gate 29 for counting. These two pulse trains must be processed to a firm time reference. A master oscillator 31 which feeds a pulse generator 33 and a pulse delay unit 35 provides accurate time data and the phase shifted pulse trains provide accurate count start data. These two informations are combined to obtain the accurately controlled time gate. The pulse delay 35 provides outputs to the coincidence gate and memory circuits 25 and the output therefrom is applied to program counter 37, start gate 39 and stop gate 41. The program counter provides outputs to both the start gate 39 and the stop gate 41. The start gate feeds one side of the gate generator 43 and the stop gate feeds the other side, and the gate generator applies its output to the frequency counter gate 29 which passes its output to a frequency counter.

Figure 4:
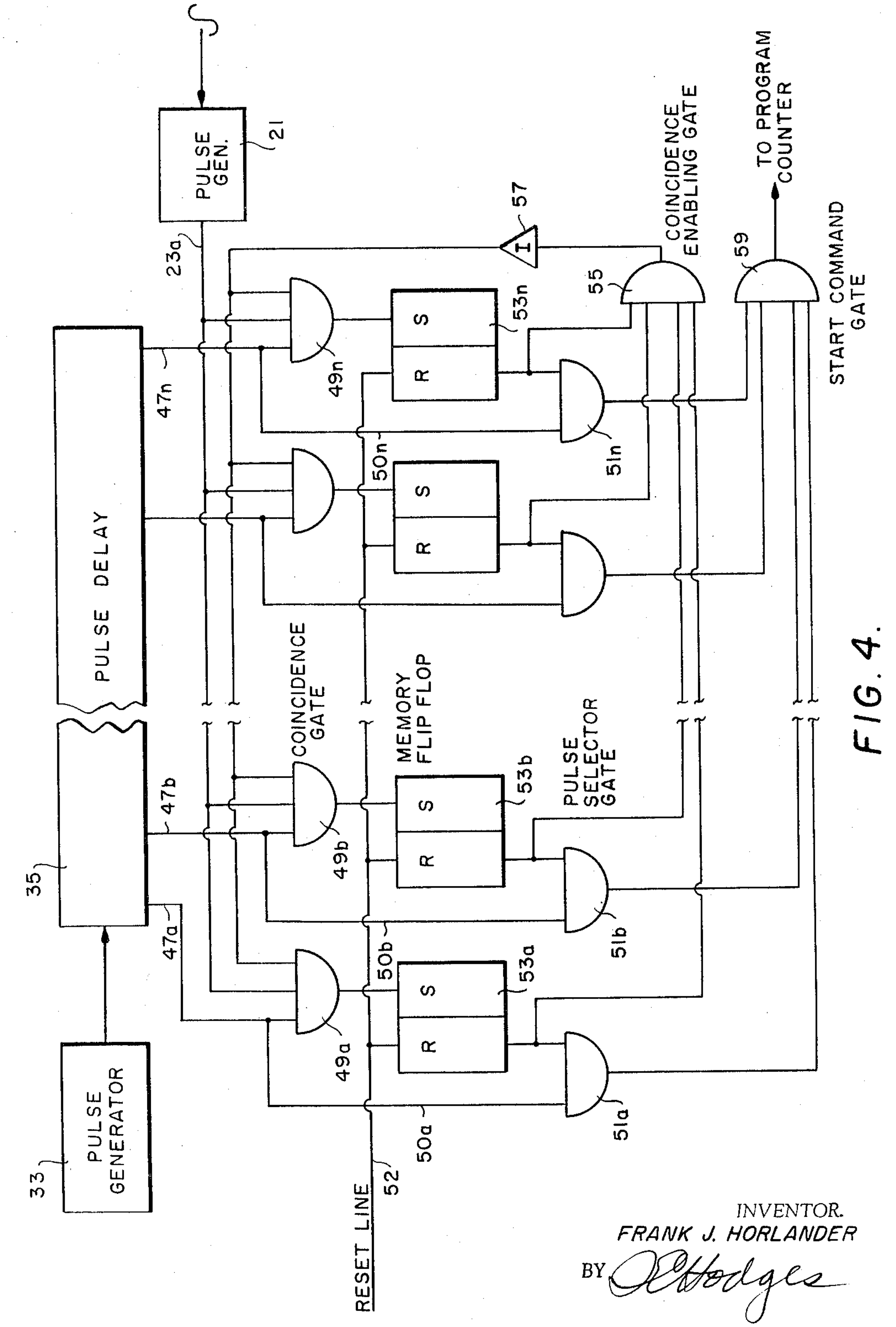
FIG. 4 is a block diagram of the coincidence gate and memory circuits portions of the system.

Referring now to FIG. 4, a block diagram of the coincidence gates and memory circuits 25 is shown. The pulse delay 35 having a plurality of outputs 47*a*–47*n* feeds a plurality of coincidence gates 49*a*–49*n* and a plurality of pulse selector gates 51*a*–51*n* whereby the output 47*a* feeds the gates 49*a* and 51*a*, and the output 47*n* feeds the gates 49*n* and 51*n*. The pulse generator 21 feeds each coincidence gate 49*a*–49*n* with the output 23*a*. The gates 49*a*–49*n* in turn feed the set side of memory flip-flops 53*a*–53*n*, whereby gate 49*a* feeds flip-flop 53*a* and so forth. The reset side of the memory flip-flops are fed by a reset line 52 and the flip-flops provide an output from the reset side to the pulse selector gates 51*a*–51*n* and to a coincidence enabling gate 55. The gate 55 passes its output to an inverter 57 which in turn feeds its output to each of the coincidence gates 49*a*–49*n*. The pulse selector gates 51*a*–51*n* provide outputs to a start command gate 59 which in turn passes its output to the program counter 37.

FIGS. 5*a* and 5*b* taken together show a circuit diagram of the novel pulse generator 21. The generator converts sine wave energy into two symmetrically located narrow width pulse trains and makes possible accurate time control. Although the generator is disclosed for use in the specific embodiment of the gate generator synchronizer system, the generator has other utility in the electronics field as a generator per se and that other means may be combined to perform the functions of the disclosed pulse generator. FIGS. 5*a* and 5*b* are connected together at connections A through D respectively shown on each sheet of the drawings.

The disclosed pulse generator uses the same type of NPN transistor throughout the circuit. The pulse generator comprises a transistor 101 having its base connected to the input terminal 103 through a capacitor 105. Resistors 107, 109, 111 are connected in series, resistor 107 being connected between the terminal 113 and ground and resistors 109 and 111 being connected in series between the terminal 113 and a 16 volt positive voltage supply 115. The collector of transistor 101 is connected to an 8 volt positive supply 116 through resistor 117 and the emitter of transistor 101 is connected both to ground through resistor 119 and to the emitter of transistor 121. Capacitors 123 and 125 are connected in series between resistors 109 and 111 and resistor 117 and the collector of transistor 101. The capacitors are grounded by a lead connected therebetween.

The base of transistor 121 is connected to ground through the parallel circuit of capacitor 127 and variable resistor 129. Resistor 129 is series connected to supply 115 through resistors 131 and 133 and resistor 135 is connected between the collector of transistor 121 and series resistors 133 and 131. The collector of transistor 121 is also connected to the base of transistor 137 which has its emitter connected to ground through resistor 139 and its collector connected to supply 115 through resistor 141. Capacitors 143 and 145 in series are connected between resistors 131 and 135 and the collector of transistor 137, the capacitor being connected to ground through a lead connected therebetween.

The emitter of transistor 137 is also connected to the base of transistor 147 through capacitor 149, the emitter of transistor 147 in turn being connected to the base of transistor 151. A resistor 153 is connected between capacitor 149 and resistor 141 and another resistor 155 is connected between ground and the base of transistor 147.

The emitter of transistor 147 and 151 are connected to ground through resistors 157 and 159 respectively, while the collectors are connected to the 8 volt supply 116 through resistor 161. The emitter of transistor 151 is connected to the emitter of transistor 161 which has its base connected to ground through a capacitor 163 and a variable resistor 165 connected in parallel and has its collector connected to supply 115 through resistor 167. A resistor 169 is connected between resistor 165 and supply 115 and series capacitors 171 and 173 are connected between the supply 115 and the collector of transistor 151, the capacitor being grounded by a lead 175 connected therebetween.

FIG. 5*b* which is a continuation of the circuitry of FIG. 5*a* shows the collector of transistor 161 connected to the base of transistor 177 which has its collector connected to supply 115 through resistor 179 and its emitter negatively biased by supply 181 through resistors 183 and 185. The emitter of transistor 177 is also connected to the base of transistor 187 through a variable capacitor 189, the capacitor being connected to ground through a resistor 191 whereby the capacitor and resistor function as a differentiator network. Transistor 187 has its base connected to the supply 116 through resistors 193 and 195 and its collector connected to the 8 volt supply through resistor 195. A capacitor 197 is connected between resistor 183 and 185 and ground and capacitors 199 and 201 in series are connected between the collector of transistor 177 and resistor 179 and resistors 193 and 195. A lead 203 is connected between capacitors 199 and 201 and a lead 205 which in turn is connected to ground through lead 175.

Transistor 187 has its emitter connected to supply 181 through resistors 207 and 185 and also connected to the bases of transistors 209 and 211. The emitters of transistors 209 and 211 are connected to ground through resistors 213 and 215 respectively while the collectors are connected to the supply 116 through primary winding 217 and resistor 219 and primary winding 220 and resistor 219 respectively. Primary winding 217 couples the signal to secondary winding 223 poled in the same direction, while primary winding 220 couples the signal to secondary winding 233 poled in the opposite direction. A lead 221 is connected between the collectors of transistors 209 and 211, and a capacitor 222 has one plate connected to lead 205 and the other plate connected between winding 220 and resistor 219.

The secondary windings 223 and 233 are connected in parallel with resistors 224 and 234 respectively and each parallel network has one terminal grounded and the other terminal connected in series with parallel networks comprising a resistor 225 and capacitor 226 and a resistor 235 and capacitor 236, respectively. The resistor-capacitor parallel networks 225, 226 and 235, 236 are respectively connected to the bases of transistors 227 and 237. The emitters of each transistor are grounded and the respective collectors are connected to supply 115 through primary winding 228 and resistor 229 and primary winding 238 and resistor 239. A capacitor 241 has one plate connected to ground and the other plate connected between winding 238 and resistor 239.

Primary winding 228 couples the signal to secondary winding 243 which is poled in the same direction and primary winding 238 couples the signal to secondary winding 245 which is poled in the opposite direction. A resistor 247 is connected in parallel with winding 243 and the parallel network has one terminal grounded and the other terminal connected to the base of output transistor 249. The collector of transistor 249 is connected to supply 115 through resistor 251 and is also connected to one plate of capacitor 255. Capacitors 253 and 255 are connected in series with one plate of capacitor 253 connected to the junction of winding 228 and resistor 229. A lead 257 connects capacitors 253 and 255 to ground. A resistor 259 is connected between the emitter of transistor 249 and ground and the output of transistor 249 is taken from the emitter.

The secondary winding 245 is connected to supply 115 through resistor 261 and is connected to ground through resistor 263. Capacitors 265 and 267, each having one plate grounded have the other plate connected between winding 245 and resistor 261, and winding 245 and resistor 263 respectively. The output transistor 269 has its base connected between winding 245 and resistor 263 and has its collector connected to supply 115 through a resistor 271 and inductor 273. A capacitor 275 having one plate connected between resistor 271 and inductor 273 has its other plate connected to ground. The transistor 269 has its emitter connected to ground and the output of the transistor is taken from the collector.

The pulse generator converts sine wave energy into two pulse trains which provide accurate time interval control for the system. A sine wave is fed into the initial stage at the left of FIG. 5*a* and the positive half of the wave is clipped, stretched and shaped by the seven transistor stages preceding the differentiator network capacitor 189 and resistor 191 as shown by the waveforms appearing below the schematic diagram. This processing is needed to provide the desired rectangular waveform. Specifically the sine wave is coupled to the base of the transistor 101. The positive portion of the sine wave biases the transistor 101 to cause it to become conductive thereby causing the transistor 121 to become nonconductive by differential action which places a positive blocking potential on the emitter of transistor 121 cutting off transistor 121 produces pulse 122. When transistor 121 becomes nonconductive the voltage on its collector becomes more positive. Which in turn raises the positive potential on the base of transistor 137 to cause it to become conductive. This causes the emitter of transistor 137 to become positive, as shown by pulse 122. The positive pulse from transistor 137, shown as pulse 122, is coupled to the base of transistor 147 by capacitor 149 causing the transistor 147 to become conductive. When the transistor 147 becomes conductive its emitter acquires a positive voltage thereon which is applied to the base of transistor 151 to cause it to become conductive. When the transistor 151 becomes conductive it develops a positive pulse on its emitter electrode, as shown by the pulse 152. The positive pulse appearing on the emitter of transistor 161 causes it to cut off. When the transistor 161 cuts off its collector goes positive placing a positive pulse on the base of transistor 177 causing the transistor 177 to become conductive. When transistor 177 becomes conductive its emitter has a positive output pulse as shown by pulse 178.

The output of transistor 187 is in the form of alternating positive and negative pulses. These pulses are applied to the bases of both NPN transistors 209 and 211 which act as signal-following inverters as indicated by the waveforms shown in FIG. 5*b*.

The output of transistor 209 is passed to a primary winding 217 which coacts with a secondary 223 to provide a first or upper pulse output path.

Similarly, the output of transistor 211 is coupled via primary winding 220 to secondary 233 for defining a second or lower pulse output path.

In the path of winding 223, the NPN transistor 227 is normally cut off and is driven to conduction by the positive going fluctuations. NPN transistor 227 amplifies these signals. The amplified pulses which are negative going are fed via the primary 228 and its secondary 243 to the base of NPN transistor 249. When the pulses become positive going, the transistor 249 is driven to conduction and provides positive output pulses on the emitter of the transistor.

Meanwhile, in the second pulse output path, the NPN transistor 237 receives at its base pulses displaced 180° in phase from those appearing on primary winding 220. The positive going pulses, as in the first path, drive the transistor 237 to conduction and the output is in the form of negative going amplified pulses displaced 180° in phase from those pulses in the upper path. The output of transistor 237 is coupled via the primary 238 and secondary 245 to the base electrode of transistor 269. When the pulses, as in the first path, become positive going, the transistor 269 is driven to conduction and provides negative output pulses on the collector of the transistor. The negative output pulse is produced because the collector of transistor 269 is originally biased to B+ by the supply 115 and the conduction of the transistor opens a path to ground causing the voltage on the collector to drop. This drop in voltage while the transistor is conducting appears as a negative output pulse on the collector of the transistor 269.

Thus, it is seen that in the upper path having input secondary 223, the transformer couplings and transistor components act together in the proper phase relations to produce a positive output pulse on the emitter of the transistor 249 which is 180° phase displaced from the negative output pulse in the lower path produced by means of transformer couplings and transistor components and finally appearing on the collector of the transistor 269. The pulse generator thereby converts sine wave energy into positive and negative pulse trains of narrow rectangular pulses displaced 180° in phase for accurate time interval control.

By way of example a pulse generator of the type illustrated in FIGS. 5*a* and 5*b* may be provided with circuit components having the following approximate values:

| | |
|---|---|
| Voltage supplies: | |
| 115 | +16 volts. |
| 116 | +8 volts. |
| 131 | −8 volts. |
| Resistors: | |
| 111, 117, 133, 141, 161, 179, 185, 195, 219, 229, 239, 251, 271 | 470 ohms. |
| 107 | 1.2 kilohms. |
| 109 | 2.7 kilohms. |
| 119 | 200 ohms. |
| 129, 165 | 0–500 ohms. |
| 131, 169 | 820 ohms. |

| | |
|---|---|
| 139, 157, 207 | 680 ohms. |
| 153 | 10 kilohms. |
| 155 | 7.5 ohms. |
| 159 | 68 ohms. |
| 167, 225, 235, 259 | 220 ohms. |
| 191, 193, 224, 234, 247 | 470 ohms. |
| 213, 215 | 150 ohms. |
| 261 | 1.5 kilohms. |
| 263 | 1.8 kilohms. |
| Capacitors: | |
| 105 | .005 farad. |
| 123, 125, 127, 143, 145, 163, 171, 173, 197, 199, 201, 222, 241, 253, 255, 265, 275 | 0.1 farad. |
| 149 | 470 pf. |
| 189 | 3–12 pf. |
| 226, 236 | 82 pf. |
| 267 | 56 pf. |
| Inductor: | |
| 273 | 100 $\mu$h. |
| Transistors: | |
| 101, 121, 147, 151, 161, 177, 187, 209, 211, 227, 237, 249, 269 | 2N834. |

These circuit values are illustrative only and constitute no limitation of the present invention.

*Operation*

The operation of the synchronous time gate shown in FIG. 3 will be discussed with reference to FIGS. 4, 5*a* and 5*b* which disclose the circuitry of the blocks of FIG. 3, and with reference to FIG. 6 which shows curves illustrating the outputs of the various system blocks.

A sine wave of unknown frequency is fed into the pulse generator 21 and is changed as shown by the waveforms appearing below the circuit shown in FIGS. 5*a* and 5*b* into two pulse trains 23*a* and 23*b*, wherein the pulses of train 23*a* are located midway between the pulses of train 23*b* for the full range of frequencies as shown in FIG. 6*a*. The output 23*a* is then fed to the coincidence gates 49*a*–49*n* of the coincidence gate and memory circuit 25 and the output 23*b* is fed to the pulse delay inverter 27.

Another pulse generator and shaper 33 converts a master clock sine wave from the master oscillator 31 into a pulse train having only positive pulses. These pulses are then fed into the pulse delay network 35 having a number of outputs 47*a*–47*n* of like polarity and accumulated delay as shown by FIG. 6*d*. The delayed outputs are fed to the respective coincidence gates 49*a*–49*n* along with the pulse train 23*a* and a D.C. voltage from a feedback loop comprising the memory flip-flops 53*a*–53*n*, the coincidence enabling gate 55 and the inverter 57. The fed back D.C. voltage changes polarity, i.e., it is a positive voltage before coincidence of the pulses and a negative voltage after coincidence is achieved.

Upon obtaining coincidence between a phase pulse from the delay network and one pulse in the pulse train as shown by the hatched pulses in FIGS. 6*a* and 6*d*, the coincidence gate which for explanatory purposes may be considered to be gate 49*b*, initiates a set pulse to the memory flip-flop 53*b*, switching the flip-flop from its reset state having a negative voltage output to its set state having a positive voltage output. The output from flip-flop 53*b* is fed to both the pulse selector gate 51*b* and the coincidence enabling gate 55. When flip-flops 53*a*–53*n* are in the normal reset state each flip-flop provides a negative voltage which is passed by the coincidence enabling gate 55 to the inverter 57 wherein the voltage becomes positive and is delivered to the coincidence gates 49*a*–49*n*. However, when flip-flop 53*b* is switched to the set state, the flip-flop provides a positive voltage output to both the pulse selector gate 51*b* and the coincidence enabling gate 55. The positive output is passed by the gate 55 to the disabling inverter 57, which thereby delivers a negative voltage to the coincidence gates 49*a*–49*n*, disabling each of the coincidence gates and blocking all other pulse delay inputs.

The pulse selector gate 51*b* which is fed by flip-flop 53*b* is also directly fed with phase pulses from the pulse delay 35 along line 50*b*. When the fli-flops 53*a*–53*n* are in the normal reset state providing a negative voltage to the respective gates 51*a*–51*n*, the gates do not pass the pulses from the pulse delay. However, when the flip-flop 53*b* is switched and delivers a positive voltage to the pulse selector gate 51*b*, the gate passes all of the phase pulses from the pulse delay tap 47*b*. The passed pulses are then delivered to the start command gate 59 which passes the pulses onto the program counter 37, start gate 39 and stop gate 41 as shown in FIG. 3.

The program counter 37 which comprises a series of slow rise and fall time flip-flops provides the time gate period. The first pulse received by the program counter causes the counter to initiate a pulse to the start gate 39 which coincides with the pulse received by the start gate from the start command gate 59. The start gate provides a pulse as shown in FIG. 6*e* to the gate generator 43 which comprises one fast rise and fall time flip-flop and provides an output as shown in FIG. 6*f* which enables the frequency counter gate 29. The program counter can be set to provide different time gate periods and upon the receipt of the last desired pulse, the counter provides a pulse to the stop gate 41 which coincides with a pulse from start command gate 59. The stop gate provides a turn-off pulse as shown in FIG. 6*e* to the gate generator 43 which in turn disables the gate 29. Since the initial coincidence pulse occurred in phase with one of the selected pulses and the turn-off pulse reaching the time gate generator will be the last selected pulse, the accuracy of the time gate generator will depend upon the accuracy of the master oscillator and upon the turn-on and turn-off delay of the gate generator 43.

The pulse delay inverter 27, located between the pulse generator 21 and the frequency counter gate 29, inverts and delays the pulse train 23*b*, as shown in FIG. 6*c*. The delay introduced by the inverter compensates for the turn-off delay of the time gate generator. The turn-on delay is not important since a delay as large as one-half period of the highest frequency can be tolerated and no such delay occurs in the turn-on time of the gate generator 43. The inverted pulses are passed by the enabled gate 29 as shown in FIG. 6*g* to a frequency counter wherein the frequency is determined.

FIG. 6*h* illustrates a situation wherein the system exhibits the maximum inaccuracy i.e., wherein the gate closes on a pulse. This worst case condition thus introduces an error in the count of the frequency counter equal to not knowing whether the last pulse was counted by the counter. Thus, through the use of the gate generator synchronizer an accuracy of $\pm\frac{1}{2}$ count in the least significant digit of the counter is achieved for it is known the counter was started between pulses and therefore the first pulse was counted by the counter.

Obviously many modifications and variations of the present invention are possible in the light of the above teachings. It is therefore to be understood that within the scope of the appended claims the invention may be practiced otherwise than as specifically described.

What is claimed is:

1. A gate generator synchronizer for a frequency measuring system having a half count accuracy comprising:

means for producing a first and a second pulse train in response to an input signal;

means providing a sequence of delayed pulses;

coincidence means receiving said delayed pulses and said first pulse train and for providing an output in response to coincidence between said delayed pulses and said pulses of said first pulse train said coincidence means having an output;

gating means responsive to the output from said coincidence means;

time gate means responsive to said gating means and to said second pulse train for passing said second pulse train fed thereto, said time gate means having an output; and counter means responsive to the output of said time gate means for counting the number of pulses passed by said time gate means whereby the frequency of said input signal is determined.

2. A gate generator synchronizer according to claim 1 wherein said means for producing said first and said second pulse train in response to an input signal is a pulse generator comprising:

an input terminal for receiving the input signal means comprising a plurality of transistor stages connected in series with said input terminal wherein the signal is clipped, stretched and shaped;

a differentiator network fed by said transistor stages wherein the shaped signal is differentiated and fed along a first and a second path;

said first path providing a first output pulse train; and said second path providing a second output pulse train having pulses displaced 180° in phase from the pulses of said first pulse train;

thereby providing a first and a second pulse train in response to an input signal.

3. A gate generator synchronizer according to claim 1 wherein said means providing a sequence of delayed pulses comprises:

a master oscillator providing a sine wave output;

a pulse generator providing a pulse output in response to the output from said master oscillator; and a delay line fed by the output of said pulse generator whereby said delay line provides a phase clock source output.

4. A gate generator synchronizer according to claim 1 wherein said coincidence means comprises:

a plurality of coincidence gates responsive to said delayed pulses and said first pulse train to provide an output said coincidence gates each having a respective output;

a plurality of flip-flops, each flip-flop being fed by a respective output of said coincidence gates, said flip-flops each having a respective output;

a plurality of pulse selector gates, each gate being fed by a respective output of each of said flip-flops and a respective delayed pulse said selector gates each having a respective output; and a start command gate fed by the outputs of said pulse selector gates providing an output in response to coincidence between said delayed pulses and said pulses of said first pulse train.

5. A gate generator synchronizer according to claim 4 wherein said coincidence means further comprises:

a coincidence enabling gate fed by the outputs of said flip-flops providing an output to an inverter;

said inverter inverting the output of said coincidence enabling gate and delivering the inverted output to said coincidence gates;

whereby said inverter provides an output of one sense to said coincidence gates for enabling said gates in response to one sense output from said enabling gate and said inverter provides an output of another sense to said coincidence gates for disabling said gates in response to another sense output from said enabling gate.

6. A gate generator synchronizer according to claim 1 wherein said gating means comprises:

a program counter fed by the output of said coincidence means providing an output to a gate generator;

said gate generator providing an output to said time gate means whereby said time gate means is enabled.

7. A gate generator synchronizer according to claim 2 wherein each of said first and said second paths comprise:

first transformer means for coupling the signal from said differentiator network;

amplifier means fed by said first transformer means providing an amplified signal;

second transformer means fed by said amplifier means for coupling the amplified signal to an output transistor;

whereby said output transistor in said first path provides an output train of positive pulses; and said output transistor in said second path provides an output train of negative pulses displaced 180° in phase from said train of positive pulses.

8. A gate generator synchronizer according to claim 7 wherein said first transformer means in said first path is arranged to couple signals in one sense; and said first transformer means in said second path is arranged to couple signals in another sense.

9. A gate generator synchronizer according to claim 2 wherein said first and said second paths further comprise:

a bias voltage supply;

a ground terminal;

first transformer means in said first path having a primary winding and a secondary winding wound in the same direction for coupling the signal in the same sense;

transistor means having an input electrode and an output electrode providing a negative going output signal in response to a positive going input signal;

means including RC circuit means coupling said secondary winding of said first transformer means to said input electrode of said transistor means;

second transformer means having a primary winding and a secondary winding wound in the same direction;

the primary winding of said second transformer means being connected to the output electrode of said transistor means;

output transistor means having a base, a collector and an emitter, said base being connected to said ground terminal and to said secondary of said second transformer means, said collector being connected to said bias voltage supply, and said emitter being connected to an output terminal, whereby a positive going signal input to the base causes said output transistor means to become conductive and provide on the output terminal a positive pulse;

third transformer means in said second path having a primary winding and a secondary winding wound in the opposite direction for coupling the signal in the opposite sense, thereby providing a signal on the secondary which is displaced 180° in phase from the signal on said secondary winding in said first path;

transistor means having an input electrode and an output electrode providing a negative going output signal in response to a positive going input signal;

means including RC circuit means coupling said secondary winding of said third transformer means to said input electrode of said transistor means;

fourth transformer means having a primary winding and a secondary winding wound in the opposite direction, said primary of said fourth transformer means being connected to the output electrode of said transistor means; and output transistor means having a base, a collector and an emitter, said base being connected to said ground terminal and to said secondary winding of said fourth transformer means, said emitter being connected to said ground terminal, and said collector being connected to said bias voltage supply and to an output terminal, whereby a positive going signal to the base causes said output transistor means to become conductive and provide on the output terminal a negative pulse which is displaced 180° in phase from the positive pulse on the output terminal in said first path.

10. A gate generator synchronizer according to claim 9 wherein each transistor means is an NPN transistor.

11. A gate generator synchronizer for a frequency measuring system having a half count accuracy according to claim 9 further comprising:

a master oscillator providing a sine wave output;

a pulse generator providing a pulse output in response to the output from said master oscillator;

a delay line fed by the output of said pulse generator whereby said delay line provides a phase clock source output;

a plurality of coincidence gates responsive to said delayed pulses and said first pulse train to provide an output, said coincidence gates each having a respective output;

a plurality of flip-flops, each flip-flop being fed by a respective output of said coincidence gates, said flip-flops each having a respective output;

a plurality of pulse selector gates, each gate being fed by a respective output of said flip-flops and a repective delayed pulse, said pulse selector gates each having a respective output;

a start command gate fed by the outputs of said pulse selector gates providing an output in response to coincidence between said delayed pulses and said pulses of said first pulse train, said start command gate having an output;

a coincidence enabling gate fed by the output of said flip-flops providing an output to an inverter;

said inverter inverting the output of said coincidence enabling gate and delivering the inverted output to said coincidence gates;

a program counter fed by the output from said start command gate providing a first and a second output in response thereto;

a start gate responsive to said first program counter output and said command gate output, providing an output;

a stop gate responsive to said second counter output and said command gate output, providing an output;

a gate generator responsive to said start gate output and said stop gate output providing an output to said time gate means;

said time gate means being fed by said second pulse train whereby said time gate means is enabled by said gate generator to pass said second pulse train and is disabled by said gate generator; and counter means for counting the number of pulses passed by said time gate means whereby the frequency of said input signal is determined.

References Cited by the Examiner

UNITED STATES PATENTS 2,886,775 5/1959 Gross ____________ 328—129 X

ARTHUR GAUSS, *Primary Examiner.*

J. ZAZWORSKY, *Assistant Examiner.*